July 18, 1967
W. E. GEHRING ETAL
APPARATUS FOR PURGING SYSTEMS HANDLING
TOXIC, CORROSIVE, NOXIOUS
AND OTHER FLUIDS
Filed May 15, 1963
3,331,404
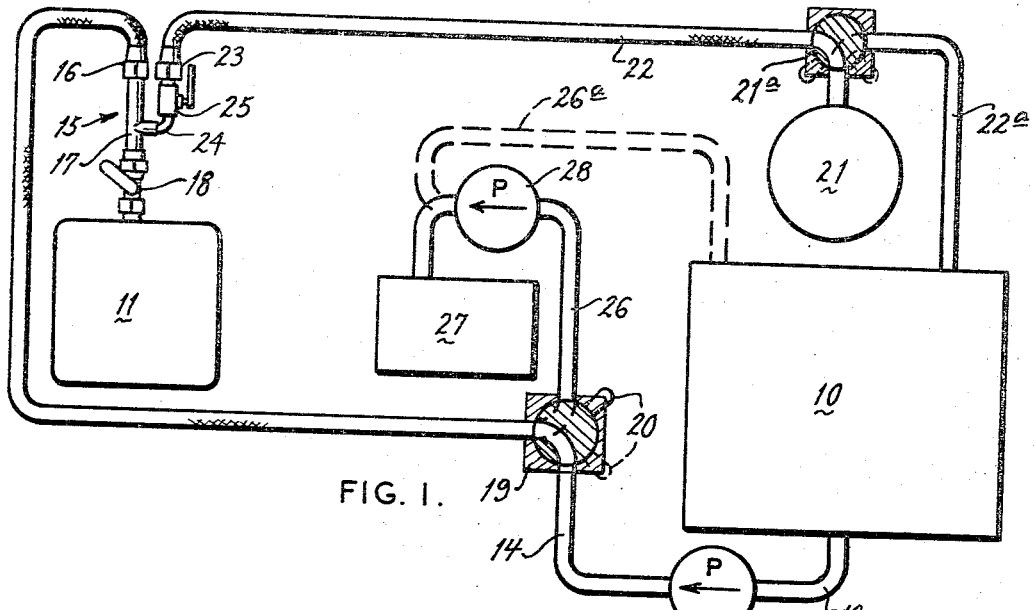
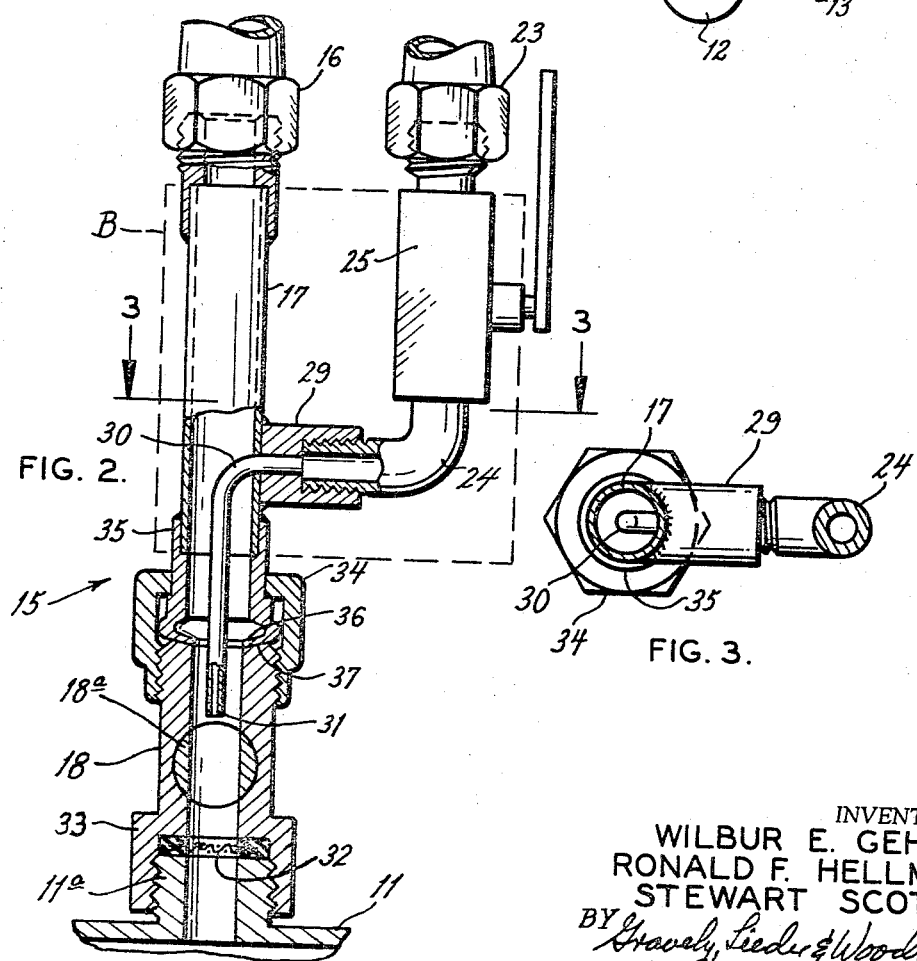
INVENTORS
WILBUR E. GEHRING
RONALD F. HELLMANN
STEWART SCOTT, III
BY *Gravely, Lieder & Woodruff*
ATTORNEYS United States Patent Office
3,331,404
Patented July 18, 1967

3,331,404
APPARATUS FOR PURGING SYSTEMS HANDLING TOXIC, CORROSIVE, NOXIOUS AND OTHER FLUIDS
Wilbur E. Gehring, St. Louis County, Ronald F. Hellmann, Florissant, and Stewart Scott III, Ferguson, Mo., granted to National Aeronautics and Space Administration under the provisions of 42 U.S.C. 2457(d)
Filed May 15, 1963, Ser. No. 280,580
1 Claim. (Cl. 141—91)

The invention described herein was made in performance of work under a NASA contract and is subject to the provisions of section 305 of the National Aeronautics and Space Act of 1958, Public Law 85–568 (72 Stat. 435; 42 U.S.C. 2457(d).

This invention relates to improvement in apparatus for systems handling toxic, corrosive, noxious and other fluids, and is particularly directed to apparatus by which conduits may be easily and positively purged of such fluids and the fumes therefrom for safety of personnel handling such fluids and for general cleansing of the system.

There are many fluids (liquids or gases) which are required to be handled with extreme care when transferred from one place to another. The transfer is usually made by a conduit system so that the fluid can be confined during the transfer. In setting up a transfer system certain conduit connections and disconnections are usually required, and it is during these operations that care must be exercised not to allow such fluids to escape. The system hereinafter described is not so much directed to preventing loss of fluid by evaporation or other effects, but to positively prevent its escape or leakage in the first place.

Important examples are systems handling rocket propellants, and Freon coolants. These materials are toxic to personnel handling the same and some have lethal effects. Thus, great care is always required to establish a leak proof system and one in which spillage is reduced to zero. Of course, a leak proof system and apparatus therein may have a wider range of applications to reduce loss of costly fluids or to prevent messy handling operations. Such examples include uses in the chemical industry where hazardous fluids are transferred from container to container and where zero spillage is required, and uses in the atomic energy field where transfer of radio active fluids is involved.

It is therefore, an important object of this invention to provide purging or scavenging means for toxic or hazardous fluid handling systems so that zero spillage may be assured.

It is an object of the invention to provide an improved system for handling the transfer of fluids of the character above indicated with means incorporated therein for purging the fluids from disconnectable conduits, hoses or the like.

It is another object of the invention to provide scavenging means for incorporation in systems of the foregoing character.

Another object of the invention is to provide scavenging means for incorporation in toxic or hazardous fluid transfer systems whereby such fluids may be positively purged by injection of inert fluids in counterflow relation.

A further object of the invention is to provide an improved device for use in fluid transfer systems of the above character so that purging fluids may be introduced at a critical joint or connection which is required to be disconnected upon completion of the transfer.

Other objects and advantages will be pointed out or will become apparent as a preferred example of the invention as disclosed in the following description and with reference to the drawings, wherein:

FIG. 1 is a schematic view of a fluid handling and purging system in which certain preferred items of apparatus are shown;

FIG. 2 is an enlarged and partially sectioned view of an item of apparatus incorporated in the system of FIG. 1; and FIG. 3 is a sectional view taken at line 3—3 in FIG. 2.

In FIG. 1 the selected system for illustration comprises a container or storage unit 10 for holding the fluid having toxic or hazardous characteristics, and 11 is the container or receiving unit. The fluid to be transferred is moved by a pump 12 from conduit 13 connected to the unit 10 into the conduit or hose 14 and flows to a filling device 15 where a connector 16 attaches the hose 14 to the main leg 17 of the device 15. The main leg 7 is, in turn, connected to the valve 18 connected to the filling port 11a of receiver unit 11. The conduit 14 has a selector valve 19 interposed therein, the control handle 20 of which is shown in its transfer position in full line. In such position of the valve 19 the pump 12 is able to transfer the fluid from storage unit 10 to receiver unit 11. In place of the pump 12, the storage unit 10 may be pressurized so that the selector valve may be used to control the system.

The system of FIG. 1 also comprises a supply tank 21 containing an inert purging medium under suitable pressure. Such medium may be gaseous nitrogen, helium, argon or even air contained under pressure at from 5 to 500 p.s.i., depending upon the character of fluid being transferred in conduit 14 to receiver unit 11. The tank 21 is provided with a conduit or hose 22 which leads to a connector 23 on a branch leg 24 of the device 15. The branch leg 24 contains a control valve 25. In addition, the system includes a discharge conduit 26 leading from the control valve 19 to a waste tank 27, or alternatively through a conduit (dotted outline) 26a back to the storage unit 10. A vacuum or suction type pump 28 is disposed in conduit 26 so that it may discharge to either the waste tank 27 or storage unit 10 through conduit 26a.

In FIGS. 2 and 3, the filling device 15 is provided with a branch inlet connector 29 for the branch leg 24, and such inlet 29 has a feed tube 30 directed into the main leg 17 and extended toward the filling valve 18 (of any suitable type) where its outlet end 31 is adjacent the valve element 18a. A filter or screen element 32 is secured over the inlet passage by the threaded end 33, and valve 18 is connected to the leg 17 by a fitting 34 which is rotatably mounted on the outlet ferrule 35. The ferrule 35 has a lip on its end which is adaptable to seat upon a complementary surface 37 on the end of valve fitting 18. The utility of the valve 18 and fitting 34 is believed to be apparent from the drawing, the object being to establish a leak proof joint for the filling valve 18 and to be able to purge the passage below seat surface 37 of all of the fluid being transferred in conduit 14.

The device 15, instead of being made as shown, may have a body B shown in broken outline. In such event, the body B would have a first inlet connection at 16, a second inlet connection at 23, an outlet at 35, a first passageway 17 between the inlet 16 and outlet 35, a second passageway 24 leading from the second inlet 23 and a control valve 25 for the passageway 24. The second passageway 24 is arranged with a portion thereof extending to the outlet end 31 which is within the valve 18 when properly connecting the body B to the filling port 11a.

In operation, the fluid from storage unit 10 is moved through conduit 14 by pump 12 (or under pressure) when the control valve 19 is in the possition shown in full line. At this time the valve 25 at the device 15 is closed. At the completion of the transfer of fluid to receiver unit 11 the valve 18 is closed and the control valve 19 is turned to its dotted line position, first having stopped pump 12. The valve 25 may then be opened and the pump 28 started. The supply of inert fluid from tank 21 flows under pressure into the branch leg 24 and tube 30 where it emerges at outlet 31 adjacent the valve element 18a to purge the inlet side of valve 18 and flow into the main leg 17 of the filling device 15 in a counter direction to the flow of the fluid transferred to unit 11. The counter flow is induced by the operation of vacuum pump 28, and the inert fluid purges the conduit 14 and valve 18 back to either the waste tank 27 or the storage unit 10, as the case may be. After a period of purging the conduit 14 and valve 18 is completely scavengel of all fluid and the filling device may be disconnected from the filling port 18, the port 18 being capped or sealed by suitable means (not necessary to show).

Certain fluids handled in the foregoing system cannot be returned to the storage unit 10, so must be led to the waste tank 27, while others can be saved for further transfer handling and are conducted by the alternate conduit 26a back to the storage unit 10.

It has been suggested that in place of pump 12 the unit 10 may be pressurized. To accomplish this, the pressurized fluid in tank 21 may be used by providing a conduit 22a from a control valve 21a, all as will be understood from the view of FIG. 1.

While the invention hereof has been shown and described in what is conceived to be a practical form, it is of course understood that changes and alterations may be made therein, all within the intended scope of the invention. Therefore, the chosen form is not to be limited to the details thereof but is to be given the full scope of the claim and so as to include any and all equivalent apparatus.

What is claimed is:

Apparatus for transferring a first fluid without spillage comprising a storage unit for the first fluid, a receiver unit to be charged with the first fluid, said receiver unit having inlet means, conduit means connected into said storage unit, control valve means in said conduit means, discharge conduit means connected into said control valve means, first fluid transfer means connected to said control valve means at one end, a filling device connected to the opposite end of said transfer means, said device having a charging port detachably connected to said inlet means at said receiver unit, a source of purging medium connected to said filling device, a discharge tube in said filling device having one end opening adjacent said charging port, the opposite end being supplied with the purging medium, a shut-off valve in the purging medium connection to control the purging medium movement through said one open end, and an evacuating means connected into said discharge conduit means, said valves being selectively movable to transfer first fluid from said storage unit to said receiver unit and to stop such first fluid transfer and introduce purging medium into said transfer means, said evacuating means drawing the purging medium through said transfer means and discharge conduit means to scavenge the first fluid therefrom.

References Cited
UNITED STATES PATENTS

| | | | |
|---|---|---|---|
| 1,437,917 | 12/1922 | Shelor | 141—389 X |
| 2,505,799 | 5/1950 | Smith | 141—20 X |
| 2,518,064 | 8/1950 | Rapisarda | 141—20 X |
| 2,684,805 | 7/1954 | McBean | 141—3 |

LAVERNE D. GEIGER, *Primary Examiner.*

E. J. EARLS, *Assistant Examiner.*